United States Patent [19]

Ohtsubo

[11] Patent Number: 5,055,508
[45] Date of Patent: Oct. 8, 1991

[54] POLYCARBONATE RESIN COMPOSITION

[75] Inventor: Kazunari Ohtsubo, Ichihara, Japan

[73] Assignee: Idemitsu Petrochemical Co., Ltd., Tokyo, Japan

[21] Appl. No.: 321,956

[22] Filed: Mar. 9, 1989

[30] Foreign Application Priority Data

Mar. 31, 1988 [JP] Japan .................................. 63-75988
Mar. 31, 1988 [JP] Japan .................................. 63-75989

[51] Int. Cl.$^5$ .......................... C08K 5/51; C08K 5/10; C08K 5/05; C08K 69/00
[52] U.S. Cl. .................................. 524/128; 524/151; 524/153; 524/310; 524/313; 524/317; 524/318; 524/385; 524/487; 524/611
[58] Field of Search ............... 524/128, 151, 153, 487, 524/317, 318, 310, 313, 385, 611

[56] References Cited

U.S. PATENT DOCUMENTS

| | | | |
|---|---|---|---|
| 3,784,595 | 1/1974 | Schirmer et al. | 524/318 |
| 3,836,499 | 9/1974 | Schirmer et al. | 524/318 |
| 4,131,575 | 12/1978 | Adelmann et al. | 524/611 |
| 4,143,024 | 3/1979 | Adelmann et al. | 524/611 |
| 4,248,976 | 2/1981 | Clubley et al. | 524/132 |
| 4,456,725 | 6/1984 | Liu et al. | 524/487 |
| 4,743,641 | 5/1988 | Sizawa et al. | 524/611 |
| 4,762,873 | 8/1988 | Miyauchi et al. | 524/128 |

Primary Examiner—Lewis T. Jacobs
Attorney, Agent, or Firm—Frishauf, Holtz, Goodman & Woodward

[57] ABSTRACT

The present invention relates to a polycarbonate resin composition comprising:
100 parts by weight of a polycarbonate resin;
  (A) 00.5 to 1 part by weight of an ester of saturated fatty acid having 10 to 30 carbon atoms and monohydric or polyhydric alcohol having 2 to 30 carbon atoms;
  (B) 0.05 to 1 part by weight of paraffin wax, and
  (C) 0 to 0.001 part by weight as a phosphorus atom of at least one phosphorus compound selected from the group consisting of phosphorus acid and phosphorous acid esters, wherein the total amount of the components (A) and (B) is 0.1 to 1 part by weight.

The present invention further relates to a polycarbonate resin composition comprising:
100 parts by weight of a polycarbonate resin;
  (D) 0.05 to 1 part by weight of β-long side chain alcohol/behenic acid ester or long chain aliphatic alcohol; and
  (E) 0 to 0.001 part by weight as a phosphorus atom of at least one phosphorus compound selected from the group consisting of phosphorous acid and phosphorus acid esters.

The composition of the present invention is excellent in heat resistance and hydrolytic resistance, and further has good mold releasing properties. Thus the composition of the present invention can be used in production of electric and electronic devices, office automatic machines, and structural parts by application of various molding methods.

24 Claims, No Drawings

POLYCARBONATE RESIN COMPOSITION

FIELD OF THE INVENTION

The present invention relates to a polycarbonate resin composition and more particularly to a polycarbonate resin composition which is excellent in mold releasing properties and further is good in heat resistance and hydrolytic resistance.

BACKGROUND OF THE INVENTION

Polycarbonate is widely used in various fields because of its excellent transparency, mechanical characteristics and dimentional stability.

In order to improve antistatic properties of polycarbonate, it is proposed to add fatty acid monoglyceride to the polycarbonate (Japanese Patent Publication No. 4141/1980).

This antistatic polycarbonate composition, however, is not satisfactory in thermal stability. Thus, a polycarbonate resin composition containing phosphorus compounds, e.g., phosphorous said 1 and phosphite, which is thermally stable, is proposed (Japanese Patent Publication No. 44552/1976).

If, however, the phosphorus compound is added in an amount of more than 0.001% by weight (10 ppm) calculated as a phosphorus atom, hydrolytic resistance is seriously deteriorated.

SUMMARY OF THE INVENTION

The present invention is intended to overcome the above prior art problems, and an object of the present invention is to provide a polycarbonate resin composition which is excellent in heat resistance and hydrolytic resistance, and further in mold releasing properties.

The present invention relates to a polycarbonate resin composition comprising:

100 parts by weight of a polycarbonate resin;
(A) 0.05 to 1 part by weight of an ester of saturated fatty acid having 10 to 30 carbon atoms and monohydric or polyhydric alcohol having 2 to 30 carbon atoms;
(B) 0.05 to 1 part by weight of paraffin wax, and
(C) 0 to 0.001 part by weight as a phosphorus atom of at least one phosphorus compound selected from the group consisting of phosphorous acid and phosphorous acid esters, wherein the total amount of the components (A) and (B) is 0.1 to 1 part by weight. This invention is hereinafter referred to as the "first invention".

The present invention further relates to a polycarbonate resin composition comprising:

100 parts by weight of a polycarbonate resin;
(D) 0.05 to 1 part by weight of β-long side chain alcohol/behenic acid ester or long chain aliphatic alcohol; and
(E) 0 to 0.001 part by weight as a phosphorus atom of at least one phosphorus compound selected from the group consisting of phosphorous acid and phosphorous acid esters. This invention is hereinafter referred to as the "second invention".

DETAILED DESCRIPTION OF THE INVENTION

The polycarbonate resin to be used as a base of the composition of the present invention is represented by the following general formula:

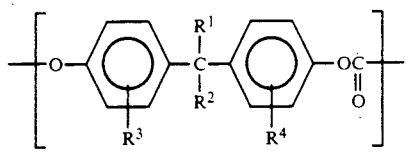

wherein $R^1$, $R^2$, $R^3$ and $R^4$ are independently a substituent, e.g. a hydrogen atom, a hydrocarbon group or a halogen atom.

The polycarbonate resin can be prepared by the solvent method in which divalent phenol and a carbonate precursor, e.g. phosgene are reacted in a solvent, e.g. methylene chloride in the presence of a known acid receptor and a known molecular weight modifier, or the ester exchange method in which divalent phenol and a carbonate precursor, e.g. carbonic acid diester (diphenyl carbonate) are subjected to an ester exchange reaction.

As the divalent phenol, bisphenols are preferably used. Of these, 4,4'-dihydroxyphenylpropane (bisphenol A) is particularly preferred. Those resulting from partial or full substitution of bisphenol A with other divalent phenol can be used. Divalent phenols other than bisphenol A include compounds such as hydroquinone, 4,4'-dihydroxydiphenyl, bis(4-hydroxyphenyl)alkane, bis(4-hydroxyphenyl)-cycloalkane, bis(4-hydroxyphenyl)sulfide, bis(4-hydroxyphenyl)sulfone, bis(4-hydroxyphenyl) sulfoxide or bis(4-hydroxyphenyl) ether, and halogenated bisphenols such as bis(3,5-dibromo-4-hydroxyphenyl)propane or bis(3,5-dichloro-4-hydroxyphenyl)propane. These divalent phenols may be in the form of homopolymers, or copolymers comprising two or more thereof, or blends thereof. In addition, the polycarbonate resin may be thermoplastic random branched polycarbonate obtained by reacting a polyfunctional aromatic compound with divalent phenol and/or a carbonate precursor.

The viscosity average molecular weight of the polycarbonate resin to be used in the present invention is preferably 10,000 to 100,000 and particularly preferably 14,000 to 35,000 from viewpoints of mechanical strength and moldability.

In the first invention, as the component (A) of the polycarbonate resin composition, an ester of saturated fatty acid having 10 to 30 carbon atoms and monohydric or polyhydric alcohol having 2 to 30 carbon atoms is used.

As the saturated fatty acid, those having 10 to 30 carbon atoms, preferably 16 to 22 carbon atoms are used. Specific examples are palmitic acid, stearic acid, arachidic acid, and behenic acid.

As the monohydric or polyhydric aclohol, those having 2 to 30 carbon atoms, preferably 2 to 28 carbon atoms are used.

As the monohydric alcohol, aliphatic higher monohydric alcohol having 2 to 28 is preferably used, with those having 14 to 22 carbon atoms being particularly preferred. Specific examples are myristic alcohol, cetyl alcohol, stearyl alcohol, aralkyl alcohol, and behenyl alcohol. These higher alcohols can be used alone or as mixtures comprising two or more thereof.

Polyhydric alcohols which can be used include dihydric alcohol, e.g., ethylene glycol, propylene glycol, ethylethylene glycol, trimethylene glycol or tetramethylene glycol; trihydric alcohol, e.g. propanetriol, methylpropanetriol, butanetriol, pentanetriol or hexanetriol; tetrahydric alcohol, e.g. erythritol, pentaerythritol, diglycerine or sorbitan; pentavalent alcohol, e.g. adonitol or arabitol; and hexavalent alcohol, e.g. allitol, talitol, sorbitol or mannitol. Of these, trivalent alcohol and tetravalent alcohol are preferred.

The above ester may be full ester or partial ester.

Suitable examples of the ester are glycerine monostearate, glycerine monobehenate, glycerine tristearate, pentaerythritol tetrastearate, and pentaerythritol distearate. In addition, those containing the above ester, e.g. beeswax can be used. The beeswax contains higher fatty acid esters, e.g., melissyl palmitinate or melissyl cerotinate, free acids, e.g. lignoceric acid or cerotic acid, hydrocarbons, e.g. pentacontane and nonacontane, and free alcohols, and is used mainly as a base of cosmetics or a lubricant of plastics.

The amount of the component (A) compounded is 0.05 to 1 part by weight, preferably 0.1 to 0.6 part by weight per 100 parts by weight of the polycarbonate resin. If the amount of the component (A) compounded is less than 0.05 part by weight, mold releasing pressure is undesirably high and in some cases, noise is generated at the time of releasing from the mold. On the other hand, if it is more than 1 part by weight, the additives bleeds out, making the resin turbid and decreasing its thermal resistance.

In the first invention, as the component (B), paraffin wax is used. This paraffin wax preferably has a softening point of 75° to 90° C. and particularly preferably a softening point of 80° to 90° C. The average number of carbon atoms of the paraffin wax is preferably 37 to 40 and particularly preferably 38 to 40.

Although such a paraffin wax belongs to petroleum wax, its softening point is different from those of microcrystalline wax, petrolatum and so on.

The paraffin wax is preferably in a solid or powder form. In this case, the particle diameter is preferably about 1 mm. Of course, it is possible that solid paraffin wax is melted by heating to more than its softening point and added.

If the softening point of the paraffin wax is less than 75° C., heat resistance is reduced and Δ YI in evaluation of heat resistance is undesirably increased. On the other hand, if it is more than 90° C., a mold releasing pressure is undesirably increased, compatibility with polycarbonate is reduced, and transparency is slightly decreased.

These paraffin waxes can be used as mixtures comprising two or more thereof.

The paraffin wax (B) is used in a proportion of 0.05 to 1 part by weight, preferably 0.1 to 0.6 part by weight per 100 parts by weight of the polycarbonate resin.

If the amount of the component (B) compounded is less than 0.05 part by weight, a mold releasing pressure is undesirably increased and in some cases, noise is generated at the time of releasing from the mold. On the other hand, if it is more than 1 part by weight, the additives bleed out, making the resin turbid.

In the first invention, it is necessary that the total amount of the components (A) and (B) is 0.1 to 1 part by weight, with the range of 0.2 to 0.8 part by weight being preferred. If the total amount of the components (A) and (B) is less than 0.1 part by weight, a mold releasing pressure is undesirably high and in some cases, noise is generated at the time of releasing from the mold. On the other hand, if the total amount of the components (A) and (B) is more than 1 part by weight, the resulting composition is turbid and its product value is seriously decreased.

In the first invention, as the component (C), at least one phosphorus compound selected from the group consisting of phosphorous acid and phosphorous acid esters is added, if necessary.

Phosphorous acid esters which can be used are those commonly used as thermal stabilizers or antioxidants. It may be monophosphites or diphosphites. Examples of monophosphite are tris(2,4-di-tertbutylphenyl) phosphite and tris(mono or di-nonylphenyl) phosphite. As diphosphite, those represented by the general formula:

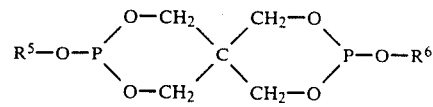

wherein $R^5$ and $R^6$ may be the same or different and are independently an alkyl group having 1 to 20 carbon atoms, a cyaloalkyl group having 3 to 20 carbon atoms, or an aryl group having 6 to 20 carbon atoms, are used. Specific examples are distearylpentaerythritol diphosphite, dioctylpentaerythritol diphosphite, diphenylpentaerythritol diphosphite, bis(2,4-di-tert-butylphenyl)pentaerythritol diphosphite, bis(2,6-di-tert-butyl-4-methylphenyl)pentaerythritol diphosphite, dicyclohexylpentaerythritol diphosphite, and tetrakis(2,4-di-tert-butylphenyl)-4,4'-biphenylene phosphite.

Of these, aromatic phosphorous acid esters such as trisnonylphenyl phosphite and trisphenyl phosphite are preferred.

The component (C) is used in a proportion of 0 to 0.001 part by weight, preferably 0 to 0.0008 part by weight as a phosphorus atom per 100 parts by weight of the polycarbonate resin. Although addition of the component (C) in the specified amount increases heat resistance and hydrolytic resistance, if it is added in an amount of more than 0.001 part by weight (10 ppm), hydrolytic resistance is seriously reduced. In this sense, it is preferred for the component (C) to be used in as small an amount as possible. In the first invention, by employing the above formulation, the amount of the component (C) used can be decreased to the smallest possible amount.

In the second invention, as the component (D), β-long side chain alcohol/behenic acid ester or long chain aliphatic alcohol is used.

The β-long side chain alcohol/behenic acid ester is a compound represented by the general formula:

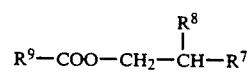

wherein $R^7$ is an alkyl group having 10 to 13 carbon atoms, $R^8$ is an alkyl group having 10 to 11 carbon atoms, and $R^9$ is a behenyl group ($C_{22}H_{45}$-).

These esters include 2-tetradecene dodecanebehenate, 2-octadecene, dodecabehenate, and 2-octadecene undecenebehenate. Of these, 2-tetradecene dodecanebehenate is preferred.

The long chain aliphatic alcohol is represented by the general formula, $C_nH_{2n+1}OH$. Higher alcohols (in the general formula, n is 25 or more) are preferred. For example, hexacosanol-1, octacosanol-1, nacosanol, melissyl alcohol and the like are preferably used.

The amount of the component (D) compounded is 0.05 to 1 part by weight, preferably 0.07 to 0.8 part by weight per 100 parts by weight of the polycarbonate resin. If the amount of the component (D) compounded is less than 0.05 part by weight, a mold releasing pressure is undesirably high and in some cases, noise is generated at the time of releasing. On the other hand, if it is more than 1 part by weight, the additives bleed out, making the resin turbid, or decreasing its heat resistance.

In the second invention, as the component (E), at least one phosphorus compound selected from the group consisting of phosphorous acid and phosphorous acid esters is used.

The component (E) is the same as the component (C) to be used in the first invention.

The component (E) is used in an amount of 0 to 0.001 part by weight, preferably 0 to 0.0008 part by weight as a phosphorus atom per 100 parts by weight of the polycarbonate resin. Although the component (E) increases heat resistance and hydrolytic resistance when added in a suitable amount, if it is added in an amount more than 0.001 part by weight (10 ppm), hydrolytic resistance is markedly decreased. In this sense, it is preferred for the component (E) to be used in as small an amount as possible. In the second invention, by using the above component (D), the amount of the component (E) can be decreased to the smallest possible amount.

In the present invention, paraffin wax is used as the component (F), if necessary.

The component (F) is the same as the component (B) to be used in the first invention.

When paraffin wax is used as the component (F), it is used in an amount of 0.05 to 1 part by weight, preferably 0.1 to 0.6 part by weight per 100 parts by weight of the polycarbonate resin. If the amount of the component (F) added is less than 0.05 part by weight, a mold releasing pressure is undesirably increased and in some cases, noise is generated at the time of releasing. On the other hand, if it is more than 1 part by weight, the additives bleed out, making the resin turbid.

When the component (F) is used, it is necessary that the total amount of the components (D) and (F) is 0.1 to 1 part by weight, with the range of 0.3 to 0.8 part by weight being preferred. If the total amount of the components (D) and (F) is less than 0.1 part by weight, a mold releasing pressure is undesirably high and in some cases, noise is generated at the time of releasing from the mold. On the other hand, if the total amount of the components (D) and (F) is more than 1 part by weight, the resulting composition is turbid and its product value is seriously decreased.

In the first invention, as described above, the aforementioned components (A), (B) and (C) are added to the polycarbonate resin in the specified proportions. In the second invention, the aforementioned components (D), (E) and if necessary, the component (F) (the component (E) is the same as the component (C), and the component (F) is the same as the component (B)) are added to the polycarbonate resin in the specified proportions.

In the present invention, as well as the above components, various additives can be added, if necessary, as long as they do not deteriorate the effects of the present invention. For example, glass fiber, carbon fiber, metal fiber, an inorganic filler, metal powder, an ultraviolet absorber, a flame retardant, a colorant and the like can be added.

The polycarbonate resin composition of the present invention can be obtained by compounding the above components and then kneading. Compounding and kneading can be carried out by the usual method, for example, by the use of a ribbon blender, a Henschel mixer, a Bambury's mixer, a drum tumbler, a monoscrew extruder, a twin-screw extruder, a cokneader, a multi-screw extruder and so on. In this kneading, a heating temperature is usually 250° to 300° C.

The polycarbonate resin composition of the present invention as described above is excellent in heat resistance and hydrolytic resistance, and further has good mold releasing properties. Thus the polycarbonate resin composition of the present invention can be used in production of electric and electronic devices, office automation machines, and structural parts, e.g. car parts by application of various molding methods, e.g. injection molding, extrusion molding, compression molding, calender molding, or rotary molding, and particularly is effective in production of products which are large sized, are small in thickness, and are required to have good mold releasing properties, by injection molding.

The present invention is described in greater detail with reference to the following examples.

EXAMPLES 1 to 13, and Comparative Examples 1 to 9

Components (A), (B) and (C) were compounded to a polycarbonate resin in the formation shown in Table 1, preliminarily kneaded in a drum tumbler, and then kneaded at 270° C. in an extruder to obtain a polycarbonate resin composition. This composition was tested by the following methods. The results are shown in Table 1.

TESTING METHOD (1) Heat Resistance ($\Delta$ YI)

Molding was continuously carried out under conditions of a cylinder temperature 290° C., a mold temperature 90° C., an injection time 20 seconds, a cooling time 20 seconds, a back pressure 5 kg/cm$^2$G and a number of screw rotations 46 rpm by the use of a 15 ounce injection molding machine and a mold with a runner (diameter: 6 mm; length: 80 mm) and capable of forming a molding piece having a size (80 mm $\times$ 80 mm $\times$ 3 mm (thickness)). The molding at the first shot and the molding at the 60th shot were measured for an yellow index (YI) according to JIS K-7103, and the difference therebetween ($\Delta$ YI) was indicated. As $\Delta$ YI is smaller, the heat resistance is better.

(2) Mold Releasing Pressure (kg/cm$^2$)

A pressure produced in an ejector was measured by the use of a coaxial cylinder having a length of 35 mm, a diameter of 40 to 42 mm, and a wall thickness of 2 mm.

(3) Metal Rust

Measured with the naked eye.

(4) Long Term Heat Resistance ($\Delta$ YI)

A test piece for measuring a degree of yellow was molded under the standard molding conditions described in (1) above. This test piece was allowed to stand for 14 days in an oven maintained at 140° C., and then an yellow index was measured. The difference (Δ YI) was indicated.

(5) Hydrolytic Resistance

A test piece for measuring a degree of yellow was molded under the standard molding conditions described in (1) above. This test piece was exposed to a saturated steam atmosphere maintained at 120° C. for 48 hours, and then a change in appearance and a viscosity average molecular weight were measured. A drop in molecular weight (Δ Mv) was indicated.

EXAMPLES 14 TO 24, and COMPARATIVE EXAMPLES 10 TO 15

Components (D), (E) and (F) were compounded to a polycarbonate resin in the formulation shown in Table 2, preliminarily kneaded in a drum tumbler and then kneaded in an extruder at 270° C. to obtain a polycarbonate resin composition. This composition was tested by the methods described in Examples 1 to 13 and Comparative Examples 1 to 9. The results are shown in Table 2.

TABLE 1

| | PC *1 (parts by weight) | (A) Ester *2 (parts by weight) | (B) Paraffin Wax *3 (parts by weight) | | (C) Phosphorus Compound *4 (parts by weight) | Heat Resistance (Δ YI) | Mold Releasing Pressure (kg/cm$^2$) | Mold Rust | Long Term Heat Resistance (Δ YI) | Hydrolytic Resistance | |
|---|---|---|---|---|---|---|---|---|---|---|---|
| | | | | | | | | | | Change in Molecular Weight (Δ Mv) | Appearance |
| Example 1 | 100 | Glyceride S-100A | 0.1 | A | 0.2 | 0.0008 | 4.5 | 27 | No rust | 4.2 | 400 | Good |
| Example 2 | " | Beeswax | 0.2 | A | 0.1 | " | 4.6 | " | " | 4.3 | 500 | " |
| Example 3 | " | Glyceride S-100A | 0.3 | A | 0.3 | 0.0003 | 4.9 | 26 | " | 4.1 | 400 | " |
| Example 4 | " | Beeswax | 0.5 | A | 0.25 | 0.0008 | 4.8 | 27 | " | 4.3 | 300 | " |
| Example 5 | " | Beeswax | 0.5 | A | 0.25 | 0.0003 | 4.7 | " | " | " | 300 | " |
| Example 6 | " | Glyceride S-100A | 0.1 | A | 0.2 | 0 | 4.5 | 29 | " | 4.0 | 400 | " |
| Example 7 | " | VPG-861 | 0.3 | A | 0.1 | 0.0008 | " | 32 | " | 4.2 | 300 | " |
| Example 8 | " | Glyceride VT | 0.3 | A | 0.1 | " | " | " | " | 4.0 | 300 | " |
| Example 9 | " | Glyceride VT | 0.5 | A | 0.07 | " | 4.4 | " | " | 4.1 | 300 | " |
| Example 10 | " | Beeswax | 0.5 | A | 0.25 | 0 | 4.7 | 26 | " | 4.2 | 400 | " |
| Example 11 | " | Glyceride S-100A | 0.1 | B | 0.2 | 0.0008 | 4.6 | 27 | " | 4.1 | 300 | " |
| Example 12 | " | Glyceride S-100A | 0.1 | C | 0.2 | " | 4.5 | " | " | 4.2 | 400 | " |
| Example 13 | " | VPG-861, Beeswax | 0.1 / 0.2 | C | 0.1 | " | " | " | " | 4.1 | 300 | " |
| Comparative Example 1 | " | — | — | — | — | " | 4.9 | 43 *5 | " | 4.2 | 500 | " |
| Comparative Example 2 | " | Glyceride S-100A | 0.3 | — | — | " | 20.3 | 27 | " | 5.3 | 400 | " |
| Comparative Example 3 | " | Beeswax | 0.3 | — | — | " | 6.2 | 28 | " | 6.3 | 500 | " |
| Comparative Example 4 | " | — | — | A | 0.3 | " | 5.5 | 29 *5 | " | 5.7 | 300 | " |
| Comparative Example 5 | " | VTG-861 | 0.3 | — | — | " | 4.7 | 36 *5 | " | 4.2 | 400 | " |
| Comparative Example 6 | " | Glyceride S-100A | 0.3 | — | — | 0.0016 | 4.5 | 27 | " | 4.2 | 2100 | Turbid |
| Comparative Example 7 | " | — | — | A | 1.2 | 0.0008 | No product value because of turbidity | | | | | |
| Comparative Example 8 | " | Glyceride B-100 | 0.3 | — | — | " | 17.5 | 27 | No rust | 5.1 | 500 | Good |
| Comparative Example 9 | " | Glyceride VT | 1.2 | A | 0.1 | " | 13.7 | 31 | " | 5.3 | 600 | " |

*1 PC: Bisphenol A polycarbonate TOUGHLON FN2200 produced by Idemitsu Petrochemical Co., Ltd.; viscosity average molecular weight: 22,100)
*2 Ester
Fatty Acid Glycerides
S-100A: Glycerine monostearate, RIKEMAL S-100A produced by Riken Vitamin Co., Ltd.
B-100: Glycerine monobehenate, RIKEMAL B-100 produced by Riken Vitamin Co., Ltd.
VT: Glycerine tristearate, RIKEMAL VT produced by Riken Vitamin Co., Ltd.
VPG-861: Pentaerythritol tetrastearate produced by Henkel Hakusui Co., Ltd.
Beeswax GOLDEN BRAND produced by Sanbon Kagaku Co., Ltd.
*3 Paraffin Wax (all produced by Nippon Seiro Co., Ltd.)
Paraffin wax A "HNP-16"; average number of carbon atom: 39.5; softening point: 89.0° C.
Paraffin wax B "HNP-9"; average number of carbon atoms: 37.1; softening point: 75.1° C.
Paraffin wax C A blend of paraffin wax A / B = 50/50; softening point: 82° C.
*4 Phosphorus compound: Trisnonylphenyl phosphite, SUMILIZER produced by Sumitomo Chemical Co., Ltd.
*5 Frictional sound in releasing was generated at the time of releasing.

TABLE 2

| | PC*1 (parts by weight) | (D) β-Long Side Chain Alcohol/ Behenic Acid Ester or Long Chain Aliphatic Alcohol (parts by weight) | | (E) Phosphorus Compound *4 (parts by weight) | (F) Paraffin Wax (parts by weight) | Heat Resistance (Δ YI) |
|---|---|---|---|---|---|---|
| Example 14 | 100 | β-Long side chain alcohol/ | 0.3 | 0.0008 | — | 4.7 |

TABLE 2-continued

| | | | | | | |
|---|---|---|---|---|---|---|
| Example 15 | " | β-Long side chain alcohol/ behenic acid ester *2 | 0.5 | 0.0003 | — | " |
| Example 16 | " | β-Long side chain alcohol/ behenic acid ester *2 | 0.07 | 0.0003 | — | " |
| Example 17 | " | β-Long side chain alcohol/ behenic acid ester *2 | 0.7 | 0.0008 | — | " |
| Example 18 | " | Long chain aliphatic alcohol *3 | 0.07 | 0 | — | 4.5 |
| Example 19 | " | Long chain aliphatic alcohol *3 | 0.5 | 0.0003 | — | " |
| Example 20 | " | Long chain aliphatic alcohol *3 | 0.7 | 0.0008 | — | " |
| Example 21 | " | Long chain aliphatic alcohol *3 | 0.5 | 0.0008 | A ... 0.3 | 4.2 |
| Example 22 | " | β-Long side chain alcohol/ behenic acid ester *2 | 0.5 | 0 | A ... 0.3 | 4.4 |
| Example 23 | " | Long chain aliphatic alcohol *3 | 0.3 | 0.0008 | B ... 0.1 | 4.5 |
| Example 24 | " | β-Long side chain alcohol/ behenic acid ester *2 | 0.3 | 0.0008 | C ... 0.07 | 4.6 |
| Comparative Example 10 | " | — | — | 0.0008 | — | 4.9 |
| Comparative Example 11 | " | — | — | 0.0008 | — *6 | 20.3 |
| Comparative Example 12 | " | — | — | 0 | — *6 | 42.1 |
| Comparative Example 13 | " | — | — | 0.0016 | — *6 | 4.5 |
| Comparative Example 14 | " | β-Long side chain alcohol/ behenic acid ester *2 | 1.3 | 0.0008 | — | No product value because of yellowing and turbidity |
| Comparative Example 15 | " | β-Long side chain alcohol/ behenic acid ester *2 | 0.3 | 0.0016 | — | 4.2 |

| | Mold Releasing | | Long Term | Hydrolytic Resisitance | |
|---|---|---|---|---|---|
| | Pressure (kg/cm²) | Mold Rust | Heat Resistance (Δ YI) | Change in Molecular Weight (Δ Mv) | Appearance |
| Example 14 | 26 | No rust | 4.0 | 400 | Good |
| Example 15 | " | " | 4.1 | " | " |
| Example 16 | 28 | " | 4.0 | " | " |
| Example 17 | 25 | " | " | " | " |
| Example 18 | " | " | 4.2 | 100 | " |
| Example 19 | 24 | " | 4.3 | 400 | " |
| Example 20 | " | " | 4.2 | 300 | " |
| Example 21 | " | " | 4.3 | 400 | " |
| Example 22 | 26 | " | " | " | " |
| Example 23 | " | " | " | " | " |
| Example 24 | " | " | " | " | " |
| Comparative Example 10 | 43 *7 | " | 4.2 | 500 | " |
| Comparative Example 11 | 27 | " | 5.3 | 400 | " |
| Comparative Example 12 | " | " | 5.7 | 800 | " |
| Comparative Example 13 | " | " | " | 2100 | Turbid |
| Comparative Example 14 | No product value because of yellowing and turbidity | | | | |
| Comparative Example 15 | 26 | No rust | 4.5 | 1900 | Turbid |

*1 PC: Bisphenol A polycarbonate, TOUGHLON FN2200 produced by Idemitsu Petrochemical Co., Ltd.; viscosity average molecular weight: 22,100
*2 β-Long side chain alcohol/behenic acid ester produced by Nippon Yushi Co., Ltd.

$C_{22}H_{45}COO-CH_2-CH-(CH_2)_{10}CH_3$ with $C_{10}H_{21}$ side chain

*3 Long chain aliphatic alcohol: $C_{26}H_{53}OH$, UNISAFE UNA produced by Nippon Yushi Co., Ltd.
*4 Phosphorus compound: Trisnonylphenyl phosphite, SUMILIZER TNP produced by Sumitomo Chemical Co., Ltd.
*5 Paraffin Wax
Paraffin wax A , "HNP-16" produced by Nippon Seiro Co., Ltd.; average number of carbon atoms: 39.5; softening point: 89.0° C.
Paraffin wax B "HNP-9" produced by Nippon Seiro Co., Ltd.; average number of carbon atoms: 37.1; softening point: 75.1° C.
Paraffin wax C A blend of paraffin wax A /paraffin wax B = 50/50 softening point 82° C.
*6 Glycerine monostearate: RIKEMAL S-100A produced by Riken Vitamin Co., Ltd.; amount compounded: 0.3 part by weight
*7 Frictional sound in releasing was generated at the time of releasing.

What is claimed is:

1. A polycarbonate resin composition comprising:
   100 parts by weight of a polycarbonate resin;
   (A) 0.05 to 1 part by weight of an ester of saturated fatty acid having 10 to 30 carbon atoms and a monohydric or polyhydric alcohol having 2 to 30 carbon atoms;
   (B) 0.05 to 1 part by weight of paraffin wax; and
   (C) 0 to 0.001 part by weight as phosphorus atom of at least one phosphorus compound selected from the group consisting of phosphorous acid and phosphorous acid esters, wherein the total amount of the components (A) and (B) is 0.1 to 1 part by weight.

2. The composition as claimed in claim 1, wherein the polycarbonate resin has a viscosity average molecular weight in the range from 10,000 to 100,000.

3. The composition as claimed in claim 1, wherein the saturated fatty acid has 16 to 22 carbon atoms.

4. The composition as claimed in claim 1, wherein the monohydric or polyhydric alcohol has 2 to 28 carbon atoms.

5. The composition as claimed in claim 1, wherein the ester is glycerine monostearate, glycerine monobehenate, glycerine tristearate, pentaerythritol tetrastearate or pentaerythritol distearate.

6. The composition as claimed in claim 1, wherein the amount of the component (A) is 0.1 to 0.6 part by weight per 100 parts by weight of the polycarbonate resin.

7. The composition as claimed in claim 1, wherein the paraffin wax has a softening point of 75° to 90° C.

8. The composition as claimed in claim 1, wherein the paraffin wax has an average number of carbon atoms of 37 to 40.

9. The composition as claimed in claim 1, wherein the amount of the component (B) is 0.1 to 0.6 part by weight per 100 parts by weight of the polycarbonate resin.

10. The composition as claimed in claim 1, wherein the phosphorus acid ester is trisnonylphenyl phosphite or trisphenyl phosphite.

11. The composition as claimed in claim 1, wherein the amount of the component (C) is 0 to 0.0008 part by weight per 100 parts by weight of the polycarbonate resin.

12. A polycarbonate resin composition comprising:
100 parts by weight of a polycarbonate resin;
(D) 0.05 to 1 part by weight of β-long side chain alcohol/behenic acid ester or long chain aliphatic alcohol;
(E) 0 to 0.001 part by weight as phosphorus atom of at least one phosphorus compound selected from the group consisting of phosphorous acid and phosphorous acid esters; and
(F) 0.05 to 1 part by weight of paraffin wax per 100 parts by weight of the polycarbonate resin.

13. The composition as claimed in claim 12, wherein the polycarbonate resin has a viscosity average molecular weight in the range from 10,000 to 100,000.

14. The composition as claimed in claim 12, wherein the β-long side chain alcohol/behenic acid ester is a compound represented by the general formula:

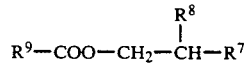

wherein $R^7$ is an alkyl group having 10 to 13 carbon atoms, $R^8$ is an alkyl group having 10 to 11 carbon atoms, and $R^9$ is a behenyl group.

15. The composition as claimed in claim 12, wherein the long chain aliphatic alcohol is represented by the general formula: $C_nH_{2n+1}OH$ wherein n is 25 or more.

16. The composition as claimed in claim 12, wherein the amount of the component (D) is 0.07 to 0.8 part by weight per 100 parts by weight of the polycarbonate resin.

17. The composition as claimed in claim 12, wherein the phosphorus acid ester is trisnonylphenyl phosphite or trisphenyl phosphite.

18. The composition as claimed in claim 12, wherein the amount of the component (E) is 0 to 0.0008 part by weight per 100 parts by weight of the polycarbonate resin.

19. The composition as claimed in claim 12, wherein the paraffin wax has an average number of carbon atoms of 37 to 40.

20. The composition as claimed in claim 12, wherein the amount of the component (F) is 0.1 to 0.6 part by weight per 100 parts by weight of the polycarbonate resin.

21. The composition as claimed in claim 13 wherein the β-long side chain alcohol/behenic acid ester is a compound represented by the general formula:

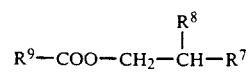

wherein $R^7$ is an alkyl group having 10 to 13 carbon atoms, $R^8$ is an alkyl group having 10 to 11 carbon atoms, and $R^9$ is a behenyl group;
the long chain aliphatic alcohol is represented by the general formula: $C_nH_{2n+1}OH$ wherein n is 25 or more;
the phosphorus acid ester is trisnonylphenyl phosphite or trisphenyl phosphite; and
the paraffin wax has an average number of carbon atoms of 37 to 40.

22. The composition as claimed in claim 21 wherein the amount of the component (D) is 0.07 to 0.8 part by weight per 100 parts by weight of the polycarbonate resin;
the amount of the component (E) is 0 to 0.0008 part by weight per 100 parts by weight of the polycarbonate resin; and
the amount of the component (F) is 0.1 to 0.6 part by weight per 100 parts by weight of the polycarbonate resin.

23. The composition as claimed in claim 2 wherein the saturated fatty acid has 16 to 22 carbon atoms;
the monohydric or polyhydric alcohol has 2 to 28 carbon atoms;
the paraffin wax has a softening point of 75° to 90° C.;
the paraffin wax has an average number of carbon atoms of 37 to 40; and
the phosphorus acid ester is trisnonylphenyl phosphite or trisphenyl phosphite.

24. The composition as claimed in claim 23 wherein the ester is glycerine monostearate, glycerine monobehenate, glycerine tristearate, pentaerythritol tetrastearate or pentaerythritol distearate;
the amount of the component (A) is 0.1 to 0.6 part by weight per 100 parts by weight of the polycarbonate resin; and
the amount of the component (B) is 0.1 to 0.6 part by weight per 100 parts by weight of the polycarbonate resin;
the amount of the component (C) is 0 to 0.0008 part by weight per 100 parts by weight of the polycarbonate resin.

* * * * *